(12) United States Patent
Shirai et al.

(10) Patent No.: US 8,374,646 B2
(45) Date of Patent: Feb. 12, 2013

(54) MOBILE DEVICE VISUAL INPUT SYSTEM AND METHODS

(75) Inventors: Kazuhiko Shirai, San Diego, CA (US); Yasuhiro Habara, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 429 days.

(21) Appl. No.: 12/573,705

(22) Filed: Oct. 5, 2009

(65) Prior Publication Data

US 2011/0081948 A1    Apr. 7, 2011

(51) Int. Cl.
*H04M 1/00*    (2006.01)
(52) U.S. Cl. ........................... 455/556.2; 715/234
(58) Field of Classification Search .............. 455/556.2; 705/14.55, 27.1, 310; 715/234, 273
See application file for complete search history.

(56) References Cited

U.S. PATENT DOCUMENTS

| 2008/0086700 | A1  | 4/2008  | Rodriguez et al. |
| 2008/0194323 | A1* | 8/2008  | Merkli et al. ............... 463/30 |
| 2008/0292137 | A1  | 11/2008 | Rhoads |
| 2011/0145068 | A1* | 6/2011  | King et al. ............... 705/14.55 |

FOREIGN PATENT DOCUMENTS

| KR | 10-2005-0078136 A | 8/2005 |
| KR | 10-0839623 B1     | 6/2008 |
| KR | 10-2008-0110324 A | 12/2008 |
| WO | 2006124473 A2     | 11/2006 |
| WO | 2007081147 A1     | 7/2007 |

OTHER PUBLICATIONS

WIPO, related PCT Application No. PCT/US2010/051163, International Publication No. WO2011/044000 dated Apr. 14, 2011, including international search report and written opinion issued on May 31, 2011, pp. 1-33.

* cited by examiner

*Primary Examiner* — Sam Bhattacharya
(74) *Attorney, Agent, or Firm* — Sony Corporation of America

(57) ABSTRACT

Systems and methods for processing an image on a mobile device, including a mobile device with a camera for capturing a digital image, a display for displaying the captured image, and an image processing module configured to detect one or more types of information contained in said captured image. The image processing module is configured to overlay the detected information as a separate layer over the captured image for view on the display. The system further includes a wireless connection coupling the mobile device to the remote server such that the captured image and detected information may be uploaded to the remote server for further processing.

20 Claims, 3 Drawing Sheets

MOBILE DEVICE VISUAL INPUT SYSTEM AND METHODS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to image capture and processing, and more particularly to image capture and processing via a mobile device.

2. Description of Related Art

Portable information devices, such as PDA's and smartphones are constrained in user interface capabilities for the input of information due to the size and numbers of the physical information input controls (buttons, keys). Input information is also usually intended for immediate use for secondary information processing, and information transfers from input methods other than keyboard typings are usually not seamlessly integrated, causing disruption of user operations and lack of intuitiveness.

Accordingly, an object of the present invention is to provide improved image capture and recognition functionality to mobile devices. At least some of these objectives will be met in the following disclosure.

BRIEF SUMMARY OF THE INVENTION

The present invention provides improved user interface and information processing abilities to portable communication devices like PDAs (Personal Digital Assistant) or smart phones equipped with imaging capabilities. In the present invention, the image captured by the in-built camera is analyzed to detect the presence of relevant information i.e. capturing the image of a business card using image recognition software and OCR (Optical Character Recognition) technology. The relevant information includes a name, a telephone number, an email address, an internet access address, etc. The detected relevant information is displayed as an overlay layer over the raw image. The overlay layer may underline, box, or highlight the relevant information and associate it with on-screen controls (hyperlinks) for subsequent user operations. The controls associated with specific relevant information perform specific actions. For example; if a phone number is detected, the user can make a call or send an SMS (Short Message Service) to the phone number. Also, in an e-mail id is detected, a new e-mail composition screen is opened in the portable device.

Additionally, the captured raw image can be encoded along with its detected elements (phone number, mail id etc.) and some additional information available with the device and sent to a server for further processing like archiving, sharing, and analysis. The network server analyses the image for extracting additional information which could not be extracted by the device. The server indexes the detected information as the metadata for the original image. The server can then utilize this metadata for further uses like relational database of user's uploaded files, recommendation for other private and public network contents, etc.

The system of the present invention includes: displaying the relevant detected information over the captured image as an overlay layer with on screen controls for subsequent user operations; associating on screen controls with specific user actions (sending mails, making calls etc), encoding the captured image along with other information (date, time etc) in a standard format and sending it to the network server for further processing, and receiving the encoded image at the network server and indexing the contained information for secondary uses (recommendation of network contents etc.).

This present invention includes a system and methods for applying the visual image input of a portable information/communications device with text and/or pattern detection algorithms to improve usability of the information obtained from a captured image. The present invention utilizes embedded camera inputs and combines image processing techniques, pattern recognition techniques, and communication/information processing steps to provide improved image data.

One aspect is a system for processing an image on a mobile device, comprising: a mobile device comprising: a camera for capturing a digital image; a display for displaying the captured image; an image processing module configured to detect one or more types of information contained in said captured image; wherein said image processing module is configured to overlay the detected information as a separate layer over the captured image for view on said display.

In one embodiment, the overlayed information is graphically modified to visually distinguish it from the captured image.

In another embodiment, the detected information comprises text; and wherein one or more portions of the text are individually selectable for performing a subsequent action with respect to selected text. The one or more controls may be applied to the detected information, such that the one or more controls provide instruction to perform an action on the mobile device upon selection of one or more portions of text.

For example, the image processing module may be configured to recognize text associated with a phone number such that the control applied to the phone number automatically dials the phone number upon selection of the text associated with the phone number.

In addition, the image processing module may be configured to recognize text associated with an email address, such that a control applied to the email address comprises a hyperlink that automatically opens a messaging application upon selection of the text associated with the email address.

Furthermore, the image processing module may be configured to recognize text associated with a URL such that a control applied to the URL comprises a hyperlink that automatically opens a browser application upon selection of the text associated with the URL.

In another embodiment, the system includes a remote server, with a wireless connection coupling the mobile device to the remote server such that the captured image and detected information may be uploaded to the remote server for further processing. The captured image and detected information may be encoded into a standard imaging format prior to upload.

In a preferred embodiment, the remote server comprises a secondary image processing module configured to detect secondary information from the captured image. For example, the secondary image processing module may be configured to index detected information as metadata for secondary uses. The secondary image processing module may also be configured to upload the detected information for use in a relational database.

In one embodiment, the remote server comprises a data transfer module configured to upload the detected secondary information back to the mobile device.

Another aspect is a method for processing an image on a mobile device, comprising: capturing a digital image with a camera associated with the mobile device; detecting one or more types of information contained in said captured image; overlaying the detected information as a separate layer over the captured image; and displaying the captured image and detected information overlay on a display associated with the mobile device.

In a preferred embodiment, the overlayed information is graphically modified to visually distinguish it from the captured image.

When the detected information comprises text, the method further comprises designating one or more portions of the text to be individually selectable for performing a subsequent action with respect to selected text.

In another embodiment, the method further comprises applying one or more controls to the detected information; and wherein the one or more controls provide instruction to perform an action on the mobile device upon selection of one or more portions of text. Performing an action on the mobile device may include one or more of the following: automatically dialing a phone number upon selection of the text associated with the phone number, opening a messaging application upon selection of the text associated with an email address, or opening a browser application upon selection of the text associated with an URL.

In yet another embodiment, the method further includes coupling the mobile device to a remote server via a wireless connection; uploading the captured image and detected information to the remote server; and performing additional processing to the captured image and detected information.

In another embodiment, performing additional processing may comprise: detecting secondary information from the captured image, indexing the detected information as metadata for secondary uses and/or uploading the detected information for use in a relational database.

Yet another aspect is a mobile device, comprising: a camera for capturing a digital image; a display for displaying the captured image; an image processing module configured to detect one or more types of information contained in said captured image; wherein said image processing module is configured to overlay the detected information as a separate layer over the captured image for view on said display.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 4. It will be appreciated that the apparatus may vary as to configuration and as to details of the parts, and that the method may vary as to the specific steps and sequence, without departing from the basic concepts as disclosed herein.

This invention includes embedded camera inputs along with image processing techniques, pattern recognition techniques, and communication/information processing steps improve usability of the information processing capabilities of camera phones/devices.

Figure 1:
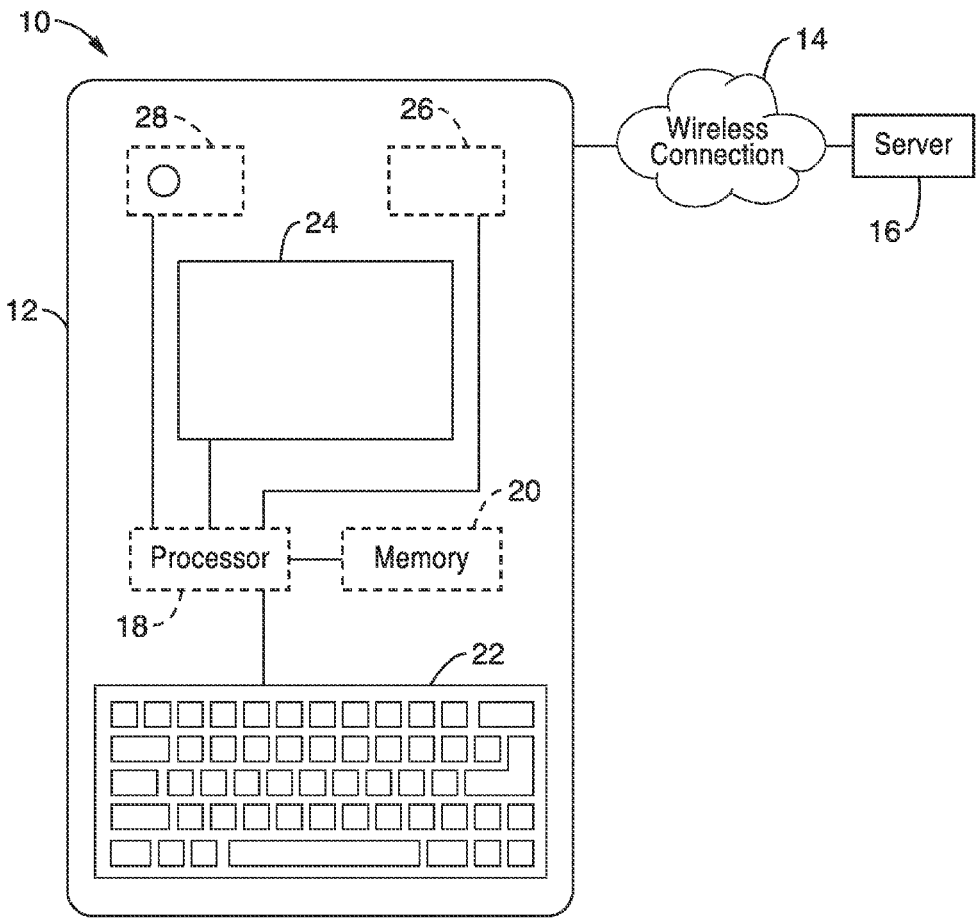
FIG. 1 is a schematic diagram of a system for image capture and recognition in accordance with the present invention.

FIG. 1 illustrates an image recognition system 10 in accordance with the present invention. System 10 includes a camera embedded phone (e.g. smartphone or the like)/PDA 12 that is coupled to a remote server 16 via wireless connection 14. Phone 12 includes a camera 28, display 24, keyboard 22 and memory 20 including software adapted in accordance with the present invention for processing a captured image via processor 18. Phone 12 also includes an antenna 26 for communicating wirelessly with other phones and server 16.

Figure 2:
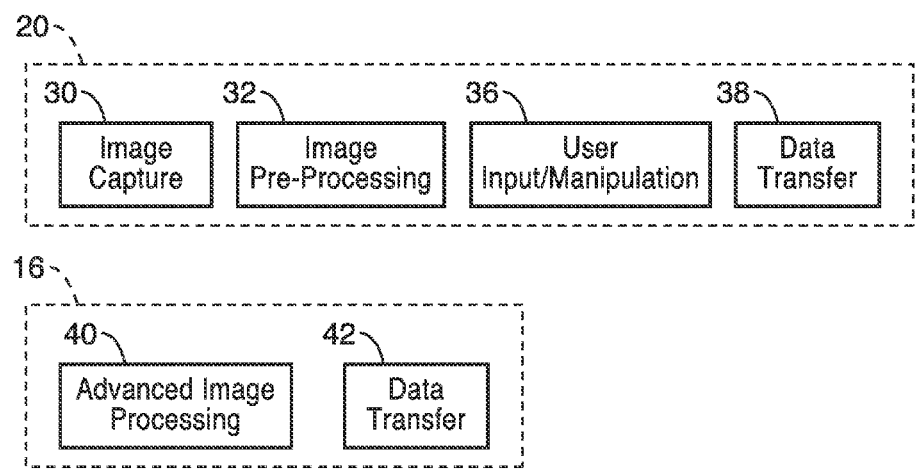
FIG. 2 illustrates various software application modules used in the system of FIG. 1.

FIG. 2 illustrates software modules stored in memory 20 and server 16 for processing image data in accordance with the present invention. Phone memory 20 includes image capture module 30, image pre-processing module 32, user input/manipulation module 36, and data transfer module 38 for transferring the pre-processed image wirelessly to a network server for advanced imaging processing. Server 16 includes an advanced image processing module 40 for further processing of the image, and data transfer module 42 for receiving the pre-processed phone data and for returning the advanced-processed image back to the phone for use by the user.

Figure 3:
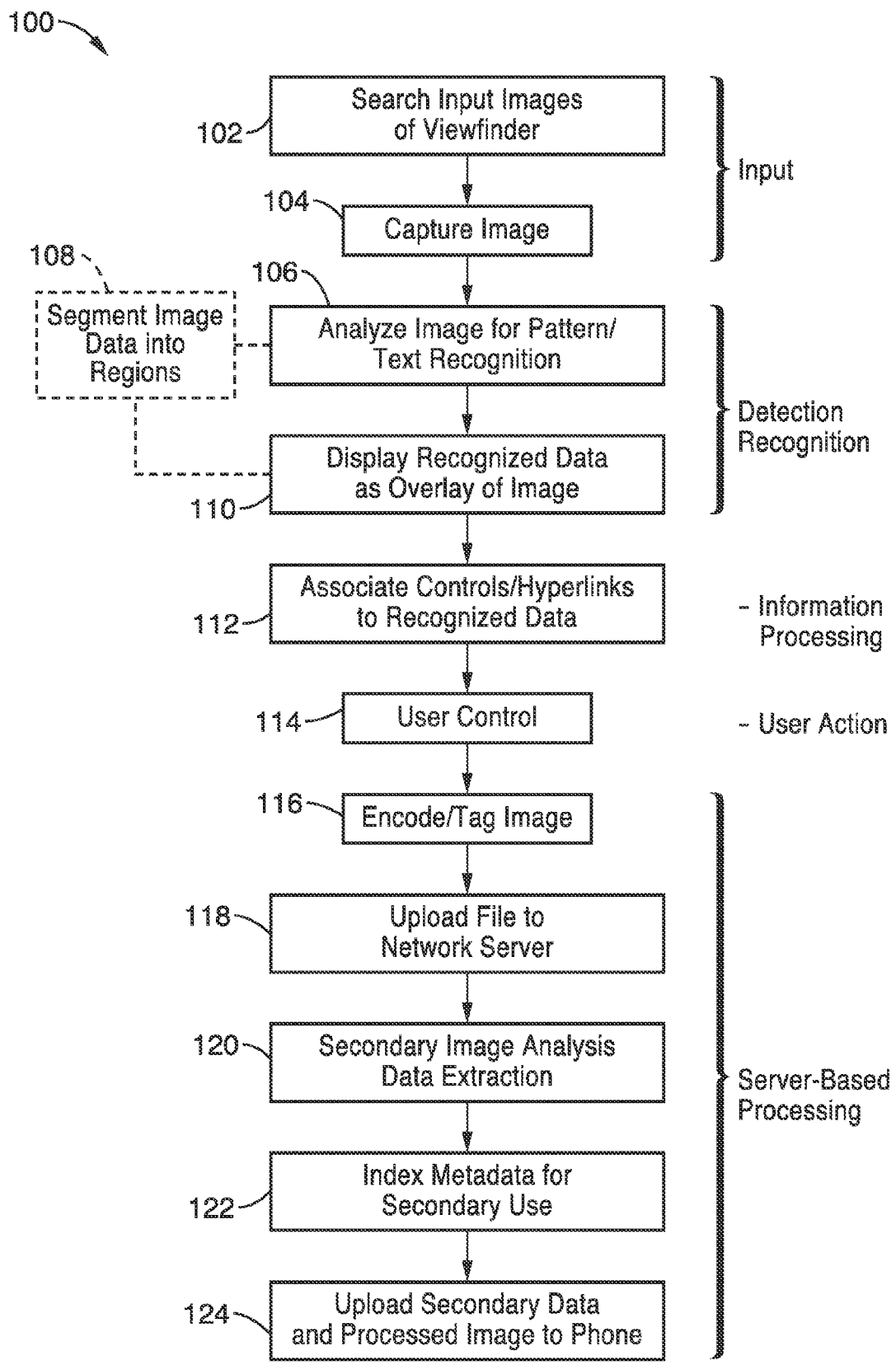
FIG. 3 illustrates a flow diagram of a method for processing image data in accordance with the present invention.

FIG. 3 illustrates an image recognition method 100 in accordance with the present invention. During the input phase an image capturing operation is generally performed by the user. An image recognition algorithm, which may be part of image capture module 30, searches input images of the camera 28 real-time view finder mode at predetermined intervals to search general patterns of predefined information types at step 102. Such patterns may comprise, telephone number, email address text information, barcode information, etc.

When the desired information image is appropriately positioned in the captured frame, the image is captured into the device 104. This capture control may be invoked by either 1)

user operation by control inputs, such as physical (e.g. keyboard 22 or on-screen "shutter" button, 2) automatic image region extraction algorithm for proper positioning for further processing, or 3) other input sensor signals such as audio input from separately embedded microphone on the device, accelerometer, etc. (not shown).

Figure 4:
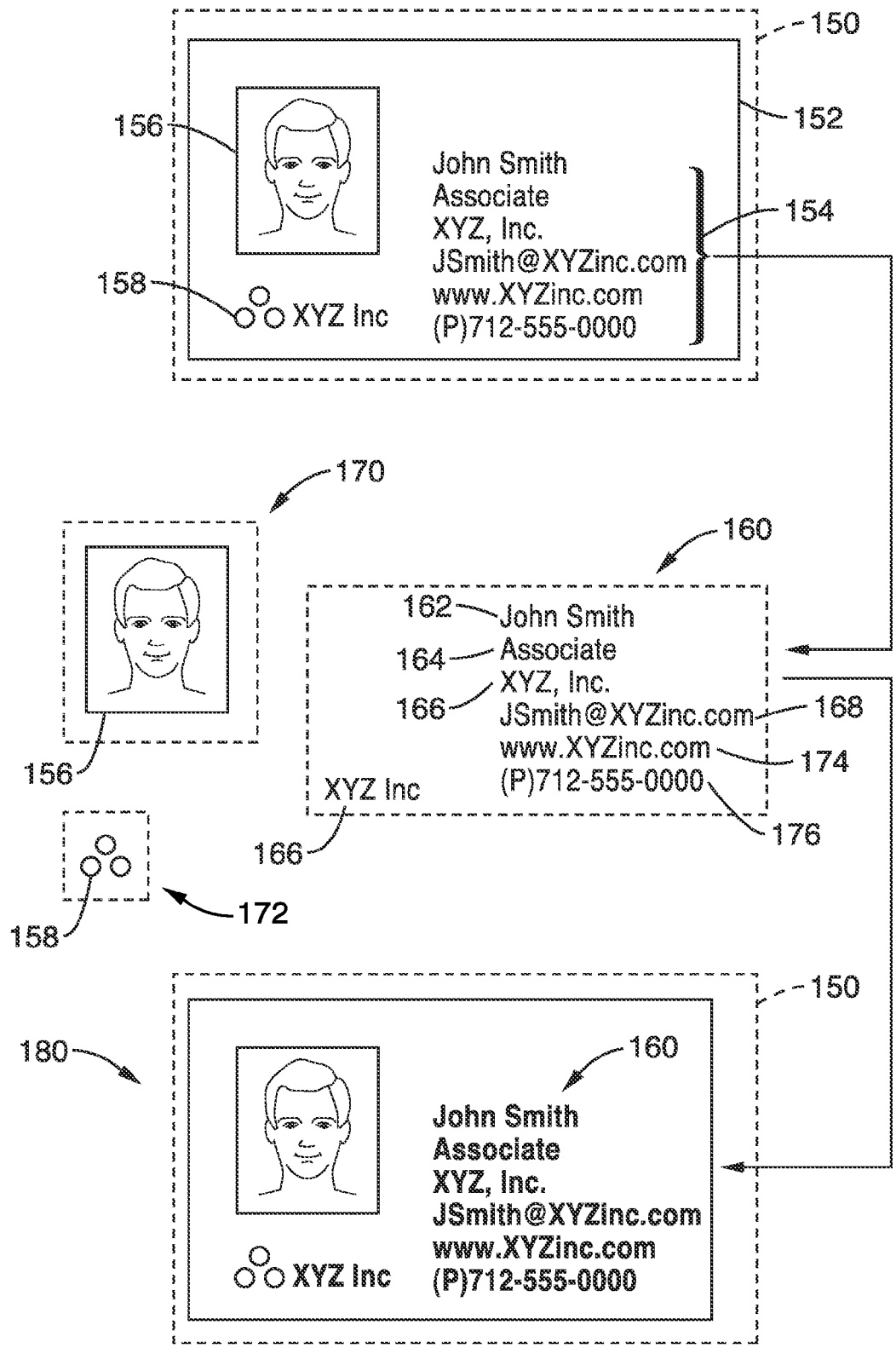
FIG. 4 illustrates a captured image and recognized data according to the method of the present invention.

Next, the image pre-processing module 32 may be used for the detection/recognition phase, which is further illustrated in FIG. 4. FIG. 4 illustrates an image capture 150 of a business card 152 having text information 154, and other graphical information such as a picture 156 and logo 158. The captured image 150 is analyzed for pattern/text recognition at step 106. The pre-processing module comprises software/code specifically configured to recognize various information types such as a telephone number 176, an email address 168, an Internet access address/website 174, or a general word/phrase level text recognition.

The detected/recognized text or other information 160 is then displayed as an overlay layer over the raw captured image 150 to create a new processed image 180 (with overlay 160). Captured information 160 may be shown as underlined, boxed, bolded, highlighted, or other visual modification to distinguish the information over the original raw image at step 110, and may be associated with on-screen controls (hyperlinks) for subsequent user operations at step 112.

Optionally, if multiple regions are detected for different information types in one raw captured image (e.g. text region 160, photo region 170, logo region 172), they presented simultaneously at step 108 for the user to subsequently select one of the options recognized in the original image.

During the information processing phase of step 112, controls (e.g. hyperlinks) attached to the captured image 150 are associated with actions depending on the detected information type.

For example, the telephone number 176 may have a predetermined set of actions provided with the preprocessing module 32. For the telephone number 176, the control action (e.g. by selecting the associated hyperlink) may be the origination of a phone call to the detected number 176 by calling to the telephone call application (not shown) in the device 12 system. Optionally, SMS/MMS message origination options (e.g. send a text, message, etc.) may be included as alternative options by means of additional drop-down menu options when the hyperlinked control is operated.

For the e-mail address 168, the programmed control action may be to open a new email composition screen by the email application (not shown) stored on the device.

When an internet access address 174, such as URL, is detected the programmed control action may be to open an Internet page with use of a Web browsing application (not shown) on the device.

For general text, or recognized information that does not fall into any of the specific application-associated actions (e.g. name 162, position 164, or company name 166, the default control action may be an Internet search query request to a predefined network service by the Web browsing application, or an dedicated network search query client application.

The user-specified action phase may be initiated via user input module 36, and may provide prompts or menus for the user based on the information detected from the raw capture 150 at step 114. Individual components of the captured information (e.g. phone number, email, etc.) may be individually selectable by the user for operating a command with respect to the selected component. Upon the user's control operation in 114, or one of the multiple detected actions of the previous step 112, the desired application program may be activated.

In a preferred embodiment, the system 10 may include an additional server-based processing phase. In the background of, or after the completion of, the user specified action at step 114, the captured image, along with detected information elements, is encoded into the standard image formats (e.g. compression formats such as JPG, GIF, PNG, TIF, etc.) at step 116. Optionally, additional information may also be encoded with the image, e.g. other censor inputs such as date/time, geographical location date, etc. as available by the other components of the device 12 system software. This data may be encoded as tag data, either within the image file format, or as a separate metadata file.

At step 118, the encoded, preprocessed file(s) are uploaded to via data transfer module 38 (which may include code for the image encoding/tagging step 116) over wireless connection 14 to a predefined network service having a computer/server 16 configured for archiving, sharing, and analysis/synthesis of the uploaded data.

The network service server preferably comprises an advanced image processing application 40 that is configured to utilize the additional computing processing power of server 16 to further analyze the image and perform secondary image analysis and data extraction at step 120. Application 10 may extract additional information elements, such as secondary text information elements (as may be captured as smaller regions of the original image 150, which may require additional image processing power not immediately available on the portable device system. Processing may also be done one other specified regions (e.g. 170, 172) containing graphical or other type of data.

At step 122, the network service server may index the detected elements (e.g. text data 160) as metadata for the original image 150. The metadata may then be utilized for further secondary uses of the information by the service or the device other applications. Examples of these secondary uses are 1) relational database of user's uploaded archival files, 2) recommendation for other private and public network contents, 3) associations/initiations with other communication services as notifications to family, friends, or community, 4) automatic synchronization with user-specified archival storage methods (such as library copy on the home computer), 5) sorting/classification of the uploaded information for future searching of the original image, etc.

The secondary data, or portions thereof, and processed image may then be uploaded back to the device 12 at step 124.

By dividing the general image text recognition process into software components and processes at the portable device 12 and the remote server 16, the portable device 12 can limit the needs of the processing power to locally extract information elements only relevant to the immediate consumptions for the portable device 12 and its embedded applications.

Furthermore, the immediately extracted information elements 160 are instantly provided as the overlay to the original image 150, along with the hyperlinked action controls. Intuitive associations of the physical information input into the device features are easily recognizable to the end-users to improve the device usability.

By seamlessly integrating network upload, detailed analysis of the tag/index information elements and relational analysis of the user's network service/application environment, the same physical input (raw image data 150, primarily) may be synthesized into a part of larger information structure contexts.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

As can be seen, therefore, the present invention includes the following inventive embodiments among others:

1. A mobile device, comprising: a camera for capturing a digital image; a display for displaying the captured image; and an image processing module configured to detect one or more types of information contained in said captured image; wherein said image processing module is configured to overlay the detected information as a separate layer over the captured image for view on said display.

2. A device as recited in embodiment 1, wherein the overlayed information is graphically modified to visually distinguish it from the captured image.

3. A device as recited in embodiment 1: wherein the detected information comprises text; and wherein one or more portions of the text are individually selectable for performing a subsequent action with respect to selected text.

4. A device as recited in embodiment 2: wherein one or more controls are applied to the detected information; and wherein the one or more controls provide instruction to perform an action on the mobile device upon selection of one or more portions of text.

5. A device as recited in embodiment 3: wherein the image processing module is configured to recognize text associated with a phone number; and wherein a control applied to the phone number automatically dials the phone number upon selection of the text associated with the phone number.

6. A device as recited in embodiment 3: wherein the image processing module is configured to recognize text associated with an email address; and wherein a control applied to the email address comprises a hyperlink that automatically opens a messaging application upon selection of the text associated with the email address.

7. A device as recited in embodiment 3: wherein the image processing module is configured to recognize text associated with a URL; and wherein a control applied to the URL comprises a hyperlink that automatically opens a browser application upon selection of the text associated with the URL.

8. A system for processing an image on a mobile device, comprising:
    (a) a mobile device, said mobile device comprising:
        (i) a camera for capturing a digital image;
        (ii) a display for displaying the captured image; and
        (iii) an image processing module configured to detect one or more types of information contained in said captured image;
        (iv) wherein said image processing module is configured to overlay the detected information as a separate layer over the captured image for view on said display;
    (b) a remote server; and
    (c) a wireless connection coupling the mobile device to the remote server such that the captured image and detected information may be uploaded to the remote server for further processing.

9. A system as recited in embodiment 8, wherein the overlayed information is graphically modified to visually distinguish it from the captured image.

10. A system as recited in embodiment 8: wherein the detected information comprises text; and wherein one or more portions of the text are individually selectable for performing a subsequent action with respect to selected text.

11. A system as recited in embodiment 9: wherein one or more controls are applied to the detected information; and wherein the one or more controls provide instruction to perform an action on the mobile device upon selection of one or more portions of text.

12. A system as recited in embodiment 10: wherein the image processing module is configured to recognize text associated with a phone number; and wherein a control applied to the phone number automatically dials the phone number upon selection of the text associated with the phone number.

13. A system as recited in embodiment 10: wherein the image processing module is configured to recognize text associated with an email address; and wherein a control applied to the email address comprises a hyperlink that automatically opens a messaging application upon selection of the text associated with the email address.

14. A system as recited in embodiment 10: wherein the image processing module is configured to recognize text associated with a URL; and wherein a control applied to the URL comprises a hyperlink that automatically opens a browser application upon selection of the text associated with the URL.

15. A system as recited in embodiment 8, wherein the captured image and detected information are encoded into a standard imaging format prior to upload.

16. A system as recited in embodiment 8, wherein the remote server comprises a secondary image processing module configured to detect secondary information from the captured image.

17. A system as recited in embodiment 16, wherein the secondary image processing module is configured to index detected information as metadata for secondary uses.

18. A system as recited in embodiment 16, wherein the secondary image processing module is configured to upload the detected information for use in a relational database.

19. A system as recited in embodiment 16, wherein the remote server comprises a data transfer module configured to upload the detected secondary information back to the mobile device.

20. A method for processing an image on a mobile device, comprising: capturing a digital image with a camera associated with the mobile device; detecting one or more types of information contained in said captured image; overlaying the detected information as a separate layer over the captured image; and displaying the captured image and detected information overlay on a display associated with the mobile device.

21. A method as recited in embodiment 20, wherein the overlayed information is graphically modified to visually distinguish it from the captured image.

22. A method as recited in embodiment 20, wherein the detected information comprises text, the method further comprising: designating one or more portions of the text to be individually selectable for performing a subsequent action with respect to selected text.

23. A method as recited in embodiment 20, further comprising: applying one or more controls to the detected information; and wherein the one or more controls provide instruction to perform an action on the mobile device upon selection of one or more portions of text.

24. A method as recited in embodiment 23, wherein performing an action on the mobile device comprises one or more of the following: automatically dialing a phone number upon selection of the text associated with the phone number, opening a messaging application upon selection of the text associated with an email address, or opening a browser application upon selection of the text associated with an URL.

25. A method as recited in embodiment 20, further comprising: coupling the mobile device to a remote server via a wireless connection; uploading the captured image and detected information to the remote server; and performing additional processing to the captured image and detected information.

26. A method as recited in embodiment 25, wherein the captured image and detected information are encoded into a standard imaging format prior to upload.

27. A method as recited in embodiment 25, wherein: performing additional processing comprises detecting secondary information from the captured image.

28. A method as recited in embodiment 27, further comprising: indexing the detected information as metadata for secondary uses.

29. A method as recited in embodiment 28, further comprising: uploading the detected information for use in a relational database.

30. A method as recited in embodiment 27, further comprising: uploading the detected secondary information back to the mobile device.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A mobile device, comprising:
a camera for capturing a digital image;
a display for displaying the captured image; and
an image processing module configured to detect one or more types of information contained in said captured image;
wherein said image processing module is configured to overlay the detected information as a separate layer over the captured image for view on said display;
wherein the detected information comprises text; and
wherein one or more portions of the text are individually selectable for performing a subsequent action with respect to selected text.

2. A device as recited in claim 1, wherein the overlayed information is graphically modified to visually distinguish it from the captured image.

3. A device as recited in claim 1:
wherein optical character recognition is performed on one or more portions of the text to identify the one or more characters of text.

4. A device as recited in claim 2:
wherein one or more controls are applied to the detected information; and
wherein the one or more controls provide instruction to perform an action on the mobile device upon selection of one or more portions of text.

5. A device as recited in claim 1:
wherein the image processing module is configured to recognize text associated with a phone number; and
wherein a control applied to the phone number automatically dials the phone number upon selection of the text associated with the phone number.

6. A device as recited in claim 1:
wherein the image processing module is configured to recognize text associated with an email address; and
wherein a control applied to the email address compises a hyperlink that automatically opens a messaging application upon selection of the text associated with the email address.

7. A device as recited in claim 1:
wherein the image processing module is confiured to recognize text associated with a URL; and
wherein a control applied to the URL comprises a hyperlink that automatically opens a browser application upon selection of the text associated with the URL.

8. A system for processing an image on a mobile device, comprising:
(a) a mobile device, said mobile device comprising:
(i) a camera for capturing a digital image;
(ii) a display for displaying the captured image; and (iii) an image processing module configured to detect one or more types of information contained in said captured image;
(iv) wherein said image processing module is configured to overlay the detected information as a separate layer over the captured image for view on said display;
(b) a remote server; and
(c) a wireless connection coupling the mobile device to the remote server such that the captured image and detected information may be uploaded to the remote server for further processing;
(d) wherein the detected information comprises text; and
(e) wherein one or more portions of the text are individually selectable for performing a subsequent action with respect to selected text.

9. A system as recited in claim 8, wherein the overlayed information is graphically modified to visually distinguish it from the captured image.

10. A system as recited in claim 8:
wherein optical character recognition is performed on one or more portions of the text to identify one or more characters of text.

11. A system as recited in claim 9:
wherein one or more controls are applied to the detected information; and
wherein the one or more controls provide instruction to perform an action on the mobile device upon selection of one or more portions of text.

12. A system as recited in claim 8:
wherein the image processing module is configured to recognize text associated with a phone number; and
wherein a control applied to the phone number automatically dials the phone number upon selection of the text associated with the phone number.

13. A system as recited in claim 8:
wherein the image processing module is configured to recognize text associated with an email address; and
wherein a control applied to the email address comprises a hyperlink that automatically opens a messaging application upon selection of the text associated with the email address.

14. A system as recited in claim 8:
wherein the image processing module is configured to recognize text associated with a URL; and
wherein a control applied to the URL comprises a hyperlink that automatically opens a browser application upon selection of the text associated with the URL.

15. A system as recited in claim 8, wherein the captured image and detected information are encoded into a standard imaging format prior to upload.

16. A system as recited in claim 8, wherein the remote server comprises a secondary image processing module configured to detect secondary information from the captured image.

17. A system as recited in claim 16, wherein the secondary image processing module is configured to index detected information as metadata for secondary uses.

18. A system as recited in claim 16, wherein the secondary image processing module is configured to upload the detected information for use in a relational database.

19. A system as recited in claim 16, wherein the remote server comprises a data transfer module configured to upload the detected secondary information back to the mobile device.

20. A method for processing an image on a mobile device, comprising:
capturing a digital image with a camera associated with the mobile device;
detecting one or more types of information contained in said captured image;
wherein the detected information comprises text;
designating one or more portions of the text to be individually selectable for performing a subsequent action with respect to selected text;
overlaying the detected information as a separate layer over the captured image;
displaying the captured image and detected information overlay on a display associated with the mobile device;
applying one or more controls to the detected information;
wherein the one or more controls provide instruction to perform an action on the mobile device upon selection of one or more portions of text;
coupling the mobile device to a remote server via a wireless connection;
uploading the captured image and detected information to the remote server; and
performing additional processing to the captured image and detected information.

* * * * *